Patented May 1, 1951

2,550,703

UNITED STATES PATENT OFFICE 2,550,703

COATING COMPOSITIONS FROM SOYBEAN OILS

Arthur J. Lewis, Helen A. Moser, and John C. Cowan, Peoria, Ill., assignors to the United States of America as represented by the Secretary of Agriculture No Drawing. Application June 25, 1948, Serial No. 35,276

4 Claims. (Cl. 106—253)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to protective coating compositions comprising soybean oil as the principal oil vehicle, and particularly to such compositions for use as exterior paints that have improved drying, color retention and durability.

This application is a continuation-in-part of application Serial No. 674,159, filed June 4, 1946, now U. S. Patent No. 2,494,565, dated January 17, 1950. Prior to this invention, attempts have been made to utilize soybean oil in paints, because soybean oil is relatively cheap and is readily available. Prior compositions have not been entirely satisfactory, and particularly in the case of exterior paints, have several important disadvantages.

One of the main disadvantages of prior soybean oil paints is the tendency of the coatings to remain tacky for long periods of time. This characteristic impairs the value of the coating, especially since dust and dirt adhere to the surfaces.

Another disadvantage which characterizes prior soybean oil paints lies in the tendency of the coatings to soften and revert to a fluid or semiliquid condition in environments of higher humidities and temperatures such as are widely encountered during summer. When softened thus, the coatings retain imbedded dust and dirt, and their durability is greatly reduced due to the stresses and strains produced by internal movements of the films.

According to our prior application previously mentioned, certain metal oxides and hydroxides are added to coating compositions comprising catalytically conjugated soybean oil. Although these metal compounds reduce the residual tack to a large extent, we have further discovered that in particular calcium oxide also improves the color retention and durability. Moreover, the improved results with calcium oxide are not only applicable to alkali or catalyst conjugated oils, but are also obtainable with compositions comprising normal soybean oil as the principal oil vehicle.

For the purposes of this application, the term "normal soybean oil" may be defined as a soybean oil from which extraneous matter has been removed by either mechanical or alkali refining methods. The extraneous matter comprises phosphatides, glucosides, polytins, sterols, mucilaginous substances, finely divided meal, and water. It is, of course, understood that the term "normal soybean oil" is in contradistinction to conjugated soybean oil.

In accordance with the present invention, we add calcium oxide as a pigment component in amounts of from 4 to 10 percent by weight of the pigment. This small amount of calcium oxide is not sufficient to cause early paint-coating failure by cracking and checking. This is in contrast to the known effect of zinc oxide, which has been used in coating compositions containing normal soybean oil. Although the zinc oxide tends to eliminate residual tack, it does not increase the durability of the coating compositions, and such coatings are subject to early excessive cracking and checking.

The exact function of calcium oxide is not precisely known, but it is probable that a reaction occurs which results in a much more stable film. In any event, the calcium oxide does not act as a mere inert pigment.

In the following examples, 13 different coatings are selected to illustrate the invention. The formulas used for the coating compositions were as follows:

Table 1.—Formulas for paint, Examples I–XIII [1]

| Ex. | Carbonate white lead | Calcium oxide | Asbestine | Zinc oxide | Cryptone M. S. 130 | Soybean oil mechanically refined | Soybean oil alkali-refined |
|---|---|---|---|---|---|---|---|
| | Pounds | Pounds | Pounds | Pounds | Pounds | Pounds | Pounds |
| I | 15 | | | | | 5 | |
| II | 14¼ | ¾ | | | | 5 | |
| III | 13½ | 1½ | | | | 5 | |
| IV | 12¾ | 2¼ | | | | 5 | |
| V | 12 | 3 | | | | 5 | |
| VI | 11¼ | 3¾ | | | | 5 | |
| VII | 11¼ | | | | 3¾ | 5 | |
| VIII | | | | | 15 | 6½ | |
| IX | | | | | 15 | | 6½ |
| X | | ¾ | | | 14¼ | 6½ | |
| XI | | ¾ | | | 14¼ | | 6½ |
| XII | | | ¾ | | 14¼ | 6½ | |
| XIII | | | ¾ | | 14¼ | | 6½ |

[1] Oil drier used in each paint was a commercial oil drier, and the amount used was five percent by volume of oil.

The drying qualities of coatings from the compositions of Examples I to VII, inclusive, are illustrated in the following table. From Table 2, it is seen that coatings containing 5 to 25 percent calcium oxide, as well as 25 percent zinc oxide, dry to brush off sand much more rapidly than those containing only lead carbonate. It may be seen further that the drying to the point of dropping off the sand when the painted disk is inverted is much more rapid in the calcium oxide paints. This latter point of drying is of great importance since it is an indication that the coating has become free from all traces of residual tack and from all possibilities of softening and aftertacking.

Table 2.—Comparative drying [1] of paint, Examples I–VII, inclusive

| Example No. | Hours required to dry to brush off sand | Days required to dry to drop off sand |
|---|---|---|
| I | Over 70 | Over 120 |
| II | 10 | 77 |
| III | 9 | 32 |
| IV | 9¼ | 10 |
| V | 9½ | 8 |
| VI | 9¼ | 7 |
| VII | 11 | 96 |

[1] These drying time determinations were carried out at 50 percent rel. humidity and 77° F. temperature by means of a Sanderson drying meter on single coatings applied uniformly by brushing to glass discs.

In Table 3, the reflectance values of the coatings of Examples I to VII are shown. The values tabulated are averages of five readings taken at similar locations on coatings by means of a Gardener portable photoelectric gloss and reflection meter (45° 0°). The instrument was previously standardized by a porcelain glass plate having a value of 91 percent compared to magnesium oxide.

In Table 4, comparative yellowing qualities and reflectance values of paint coatings from Examples VIII to XIII are shown. The data was obtained as in Table 3.

Referring again to Table 3, it will be noted that 16 and 26 months of outdoor exposure tests at 45° south cause the lead carbonate and lead carbonate-zinc oxide coatings to drop considerably in reflectance values from their normal. Those coatings containing lead carbonate and calcium oxide (Examples II to VI) are considerably improved in reflectance properties. It should be noted that the gain in reflectance by the all-lead carbonate coating (Example I) after 26 months of exposure over the 16-month value is due to the normal self-cleaning by chalking that has taken place. Nevertheless, the reflectance of the coating from Example II is considerably greater.

Referring to Table 4, it is to be noted that calcium oxide improves the reflectance values, as well as the non-yellowing qualities of the coatings made from Examples X and XI compared with Examples VIII, IX, XII and XIII which contain comparable oil vehicles. Cryptone M. S. 130, the pigment employed in these particular examples, is a proprietary name for a mixture of approximately 50 percent micaceous magnesium silicate and 50 percent zinc sulfide.

Table 3.—Comparative reflectance values of paint, Examples I–VII, inclusive

| Example Number | After drying three days in light | After 16 mos. exposure at 45° South | After 26 mos. exposure at 45° South |
|---|---|---|---|
| I | 87 | 29 | 53. |
| II | 88 | 72 | 71. |
| III | 90 | 77 | Test discontinued after 16 mos. |
| IV | 86 | 73 | Do. |
| V | 87 | 75 | Do. |
| VI | 85 | 72 | Do. |
| VII | 85 | 62 | 55. |

Table 4.—Comparative reflectance values and yellowing of paint, Examples VIII–XIII, inclusive

| Example Number | Reflectance values after drying in the dark for a week | Reflectance values after outdoor exposure for a week at 45° South | Visible color noted after storage in dark for two weeks |
|---|---|---|---|
| VIII | 63 | 62 | Light ivory. |
| IX | 66 | 64 | Light cream. |
| X | 72 | 72 | White. |
| XI | 78 | 74 | Do. |
| XII | 70 | 66 | Medium cream. |
| XIII | 70 | 69 | Light cream. |

In Table 5 are tabulated comparative reflectance readings for lead pigment paints containing calcium oxide in which catalytic conjugated soybean oil, normal non-break soybean oil and raw linseed oil may be compared. It will be noted that the soybean oils in this formulation compare favorably and in some instances are actually superior to linseed oil. In addition, Table 5 illustrates an all-lead carbonate paint with the three different oils. The effect of the calcium oxide in the soybean oil compositions is apparent.

Table 5.—Comparative reflectance readings from white point films

| Example Number | Composition | Normal soybean oil | | | Catalytically conjugated soybean oil | | | Raw linseed oil | | |
|---|---|---|---|---|---|---|---|---|---|---|
| | | A | B | C | A | B | C | A | B | C |
| XIV–XVI | Basic carbonate white lead + 5½ percent CaO. | 87 | 90 | 61 | 86 | 92 | 65 | 83 | 90 | 61 |
| XVII–XIX | All basic carbonate white lead. | 87 | 80 | 48 | 90 | 78 | 34 | 85 | 90 | 64 |

Column A—average of five readings taken before outdoor exposure of films; film air-dried for 96 hours.
Column B—average of five readings taken after outdoor exposure of films for nine days.
Column C—average of five readings taken after outdoor exposure of films for three months and six days.

The following table shows the results of comparative yellowing in various coating compositions containing mechanically refined soybean oil as the principal oil vehicle. It will be noted that of the various oxides used as addition pigments only calcium oxide produced a substantially non-yellowing coating. The tests consisted of storing the several coatings in the dark for a period of two weeks.

Table 6.—Comparative yellowing of other paints containing mechanically refined soybean oil

| Pigment components of paints | Visible color noted after storage in dark for two weeks |
|---|---|
| 100 percent basic carbonate white lead | Medium yellow. |
| 95 percent basic carbonate white lead, 5 percent calcium oxide. | White. |
| 95 percent basic carbonate white lead, 5 percent strontium oxide. | Light cream. |
| 95 percent basic carbonate white lead, 5 percent calcium carbonate. | Medium yellow. |
| 95 percent basic carbonate white lead, 5 percent calcium phosphate. | Do. |
| 95 percent basic carbonate white lead, 5 percent calcium oxalate. | Do. |
| 95 percent basic carbonate white lead, 5 percent mineralite. | Do. |
| 95 percent basic carbonate white lead, 5 percent asbestine. | Do. |
| 100 percent Titanox B-30 | Medium cream |
| 95 percent Titanox B-30, 5 percent calcium oxide. | White. |
| 95 percent Titanox B-30, 5 percent asbestine. | Deep cream. |

Titanox B-30 is a proprietary composition comprising about 30 percent titanium dioxide and about 70 percent barium sulfate.

In Tables 7, 8, and 9, the comparative durability of coatings made from the compositions of Examples I to XIII are tabulated. The results of Table 7 were obtained in a National Carbon Company XIA Machine which is designed to produce accelerated weathering conditions. The term "BCWL" refers to basic carbonate white lead.

Table 7.—Comparative durability determined by accelerated weathering

| Paints tested | Exposure hours | | | | |
|---|---|---|---|---|---|
| | 200 | 350 | 500 | 800 | 1,000 |
| Example I | Coating OK and white. | Coating OK and white. | Coating beginning to erode by chalking. | Coating has eroded considerably. | Coating has continued erosion and begun cracking. |
| Example II (95% BCWL and 5% lime). | do | do | Coating OK and white. | Coating OK and white. | Coating OK and white. |
| Example III (90% BCWL and 10% lime). | do | do | do | Coating has begun checking and cracking on surface. | Coating has checked and cracked moderately on surface. |
| Example IV (85% BCWL and 15% lime). | do | do | do | do | Coating has begun checking and cracked moderately on surface. |
| Example V (80% BCWL and 20% lime). | do | do | Coating has checked moderately on surface. | Coating has checked and cracked considerably on surface. | Coating has begun to scale from wood. |
| Example VI (75% BCWL and 25% lime). | do | Coating has begun to check. | do | do | Coating has scaled considerably from wood. |
| Example VII (75% BCWL and 25% zinc oxide). | Coating OK but color is light gray. | Coating OK but color is light yellow-gray. | Coating beginning to surface check. | Coating has checked considerably on surface. | Coating has checked and cracked badly with many deep cracks. |

Table 7.—*Comparative durability determined by accelerated weathering*—Continued

| Paints tested | Exposure hours | | | |
|---|---|---|---|---|
| | 1,250 | 1,750 | 2,000 | 2,500 |
| Example I | Coating has eroded so badly that wood is almost entirely bare. | Out of test | | Coating should have been repainted after 800 hrs. exposure. |
| Example II (95% BCWL and 5% lime). | Coating beginning to erode by chalking. | Coating has eroded moderately. | Coating has eroded considerably. No cracking. | Coating is in excellent condition for repainting. |
| Example III (90% BCWL and 10% lime). | Coating has eroded moderately. | Coating has eroded considerably. | Coating has eroded badly. | Coating is in fair condition for repainting. |
| Example IV (85% BCWL and 15% lime). | Coating has begun to scale from wood. | Coating has scaled from wood moderately. | Coating has scaled from wood considerably. | Coating is not in condition for repainting. |
| Example V (80% BCWL and 20% lime). | Coating has scaled considerably from wood. | Coating has scaled badly from wood. | Coating has scaled very badly from wood. | Do. |
| Example VI (75% BCWL and 25% lime). | Coating has scaled badly from wood. | Coating has scaled very badly from wood. | Coating has scaled very badly from wood and is very fragile. | Do. |
| Example VII (75% BCWL and 25% zinc oxide). | Coating has begun to scale from wood in few areas. | Out of test | | Coating was not in condition for repainting at 1,250 hrs. exposure. |

Table 8.—*Comparative durability and dirt retention (outdoor weathering at 45° south)*

| Paints tested | Length of exposure in months | | | | | |
|---|---|---|---|---|---|---|
| | 1 | 3 | 5 | 7 | 16 | 26 |
| Example I (All BCWL). | Coating OK. Considerable dirt retention. Light gray color. | Coating OK. Heavy dirt retention. Medium gray color. | No change | No change | Coating has checked on surface moderately in very fine checks. Gray color. | Coating has retained considerable dirt which cannot be removed by vigorous washing, hence only fair for repainting. |
| Example II (95% BCWL+5% lime). | Coating OK. Clean. White. | No change | do | No change. Best in general appearance. | Coating has checked on surface moderately in very fine checks. White and clean. | Coating superior to above in that the checks are on surface only and it is clean. Excellent for repainting. |
| Example III (90% BCWL+10% lime). | do | do | Coating checking considerably on surface. | No change | Coating has checked and cracked badly, some deep. Light gray color. | Coating was fair for repainting at end of 16 months exposure. |
| Example IV (85% BCWL+15% lime). | Coating OK. Light dirt retention. White. | do | do | do | Coating has cracked and scaled from wood very badly. | Coating was very poor for repainting at end of 16 mos. exposure. |
| Example V (80% BCWL+20% lime). | do | do | do | do | Coating has cracked and scaled from wood almost completely. | Coating was worthless for repainting at end of 16 mos. exposure. |
| Example VI (75% BCWL+25% lime). | Coating OK. Moderate dirt retention. White. | do | do | do | do | Do. |
| Example VII (75% BCWL+25% zinc oxide). | Coating OK. Moderate dirt retention. Light gray color. | do | Coating beginning to check and crack. | Coating has cracked badly in irregular pattern. | Coating has alligatored very badly and is dark gray in color. | Coating is in poor condition for repainting due to deep alligator checks. |

Table 9.—*Comparative durability and dirt retention (outdoor weathering at 45° south)*

| Paints tested | Length of exposure | | | |
|---|---|---|---|---|
| | 3 days | 8 months | 1 year | 18 months |
| Example VIII | Coating OK. Considerable dirt retention. Off white to gray. | Coating has cracked considerably on the surface. | Coating has cracked considerably through to wood. | On repainting, the deep cracks show through badly. |
| Example IX | Coating OK. Considerable dirt retention. Off white to light gray. | do | do | Do. |
| Example X | Coating OK. No dirt retention. White. | Coating OK. (No checking or cracking.) | Coating OK. (No checking or cracking.) | The coating has repainted excellently due to the absence of cracking and a moderate erosion. |
| Example XI | do | do | do | Do. |
| Example XII | Coating OK. Considerable dirt retention. Light gray color. | Coating has cracked considerably on the surface. | Coating has cracked considerably through to wood. | On repainting, the deep cracks show through badly. |
| Example XIII | Coating OK. Considerable dirt retention. Very light gray color. | do | do | Do. |

In the above Tables 8 and 9, the results of outdoor weathering are tabulated. The exposure was made at 45° in order to give maximum dirt retention and faster film breakdown.

The three tables immediately above demonstrate the ability of the coating compositions of this invention to produce durable coatings. The durability is illustrated by the decreased chalking, checking, and cracking, and by the very important characteristic of improved condition for repainting. In addition to the durability, the advantages of less dirt retention and improved whiteness (i. e., non-yellowing) are pronounced as may be seen from the preceding tables.

Tables 10 and 11 are similar to the three foregoing tables. Table 10 contains data showing the results of accelerated weathering tests on three coatings containing catalytically refined soybean oil as the oil vehicle. The data was obtained as in Table 7. Table 11 shows the effects of outdoor weathering on the same three coatings. It will be noted that those containing 5 and 10 percent calcium oxide withstood both tests satisfactorily, and at the conclusion were in excellent condition for repainting, whereas those containing no calcium oxide failed early in the tests.

In addition, exposures of the same paints at 90° exposure, north and south, for 30 months have shown comparable results, i. e., the refined soybean oil paint containing calcium oxide had superior durability to and retained less dirt than the refined soybean oil paint containing no calcium oxide.

We claim:

1. A paint composition consisting essentially of normal soybean oil as the principal oil vehicle, calcium oxide, basic carbonate of white lead, and a drier, the calcium oxide being present in an amount within the range of 4 to 10 percent of the total weight of calcium oxide and basic carbonate of white lead, the ratio of said total weight to weight of oil vehicle being about 3:1.

2. A paint composition consisting essentially of normal soybean oil as the principal oil vehicle, calcium oxide, a pigment other than calcium oxide, and a drier, the calcium oxide being present in an amount within the range of 4 to 10 percent of the total weight of the calcium oxide and the other pigment, the ratio of said total Table 10.—Comparative durability determined by accelecarted weathering

| Paints tested | Exposure hours | | | | |
|---|---|---|---|---|---|
| | 200 | 350 | 500 | 800 | 1000 |
| Catalytically refined soybean oil and basic carbonate lead. | Coating OK and white. | Coating beginning checking and cracking. | Coating has checked and cracked considerably on surface. | Coating has flaked off to bare wood moderately. | Coating has flaked off exposing considerable wood. |
| Catalytically refined soybean oil and 95% basic carbonate lead with 5% calcium oxide. | ----do---------- | Coating OK and white. | Coating OK and white. | Coating beginning to chalk. | Coating chalking moderately. |
| Catalytically refined soybean oil and 90% basic carbonate lead with 10% calcium oxide. | ----do---------- | ----do---------- | ----do---------- | ----do---------- | Coating chalking considerably. |

| Paints tested | Exposure hours | | | |
|---|---|---|---|---|
| | 1250 | 1750 | 2000 | 2500 |
| Catalytically refined soybean oil and basic carbonate lead. | Coating has flaked off badly. Half of wood panel bare. | Out of test---------- | | Coating should have been repainted before 800 hours. |
| Catalytically refined soybean oil and 95% basic carbonate lead with 5% calcium oxide. | Coating unchanged-------- | Coating has eroded slightly. | Coating unchanged. No cracking. | Coating is in excellent condition for repainting. |
| Catalytically refined soybean oil and 90% basic carbonate lead with 10% calcium oxide. | ----do---------- | Coating has eroded moderately. | ----do---------- | Do. |

Table 11.—Comparative durability and dirt retention (outdoor weathering at 45° south)

| Paints tested | Length of exposure in months | | | | | |
|---|---|---|---|---|---|---|
| | 1 | 3 | 5 | 7 | 16 | 26 |
| Catalytically refined soybean oil. Basic carbonate lead. | Coating OK. Very heavy dirt retention. Dark gray color. | Coating has begun to crack. Very heavy dirt retention. Dark gray color. | No change. | Coating has large and deep checks and cracks. Very heavy dirt retention. Dark gray color. | No change---------- | Coating is not suitable to repaint due to deep checks and cracks and the retained dirt. |
| Catalytically refined soybean oil and 95+ basic carbonate lead with 5% calcium oxide. | Coating OK. Clean. White. | No change---------- | ----do---- | No change---------- | Coating has eroded and surface checked moderately. | Coating superior to above in that the checks are on the surface and that it is clean. Excellent for repainting. |
| Catalytically refined soybean oil and 90% basic carbonate lead with 10% calcium oxide. | ----do---------- | ----do---------- | ----do---- | Coating has light surface checking. | Coating has eroded and surface checked considerably. | Do. |

The calcium oxide used in the composition of this invention should be essentially all calcium oxide. Minor amounts of calcium hydroxide, such as may be present after exposure to air in handling is not detrimental, however.

The advantageous effect of calcium oxide as an addition to the pigment is outstanding in the case of lead base paints. We have found, however, that soybean oil paints are characterized by increased durability and by decreased yellowing and residual tack, regardless of the type of pigment.

weight to weight of oil vehicle being in the range of about 15:5 to about 15:6.5.

3. The composition of claim 2 in which the oil vehicle is alkali refined soybean oil.

4. The composition of claim 2 in which the oil vehicle is mechanically refined soybean oil.

ARTHUR J. LEWIS.
HELEN A. MOSER.
JOHN C. COWAN.

(References on following page)

REFERENCES CITED

The following references are of record in the file of this patent:

UNITED STATES PATENTS

| Number | Name | Date |
|---|---|---|
| 1,074,364 | Horn | Sept. 30, 1913 |
| 1,277,425 | King et al. | Sept. 3, 1918 |
| 1,314,301 | Applegreen | Aug. 26, 1919 |
| 1,889,842 | Parr | Dec. 6, 1932 |
| 2,353,623 | Burr | Sept. 19, 1944 |
| 2,406,337 | Auer | Aug. 27, 1946 |
| 2,494,565 | Lewis et al. | Jan. 17, 1950 |

OTHER REFERENCES

"Uses and Applications of Chemicals and Related Materials," Gregory, vol. 1, page 141, under Calcium Oxide; "Paint and Varnish," Reinhold Publishing Corp., New York, 1939.